United States Patent
Ley et al.

(10) Patent No.: US 9,033,807 B1
(45) Date of Patent: May 19, 2015

(54) PROPSHAFT ASSEMBLY WITH DAMPER

(71) Applicant: American Axle & Manufacturing, Inc., Detroit, MI (US)

(72) Inventors: Jason Ley, Detroit, MI (US); Zhaohui Sun, Detroit, MI (US); Jeffrey P. Nyquist, Detroit, MI (US); Michael Voight, Detroit, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/158,280

(22) Filed: Jan. 17, 2014

Related U.S. Application Data

(60) Provisional application No. 61/897,721, filed on Oct. 30, 2013.

(51) Int. Cl.
*F16C 3/03* (2006.01)
*B21D 39/04* (2006.01)
*B21D 53/88* (2006.01)
*F16C 3/02* (2006.01)

(52) U.S. Cl.
CPC ................ *F16C 3/023* (2013.01); *B21D 53/88* (2013.01); *B21D 39/04* (2013.01); *Y10T 464/50* (2013.01)

(58) Field of Classification Search
USPC ........... 464/127, 180; 188/381; 180/378–380; 29/407.07, 428, 888, 889.61
See application file for complete search history.

(56) References Cited

U.S. PATENT DOCUMENTS

| | | | |
|---|---|---|---|
| 2,001,166 A | 5/1935 | Swennes | |
| 2,028,930 A * | 1/1936 | Taylor | 188/379 X |
| 2,751,765 A | 6/1956 | Rowland et al. | |
| 3,052,107 A | 6/1956 | Kempf | |
| 3,075,406 A * | 1/1963 | Butler, Jr. et al. | 464/180 X |
| 3,592,884 A | 7/1971 | Williams | |
| 4,014,184 A | 3/1977 | Stark | |
| 4,043,147 A | 8/1977 | Wiebe | |
| 4,124,928 A | 11/1978 | Stark | |
| 4,186,162 A * | 1/1980 | Daley | |

(Continued)

OTHER PUBLICATIONS

"Contemporaneous." Dictionary.com. [online], [retrieved on May 14, 2014] Retrieved from the Internet <URL: http://dictionary.reference.com/browse/contemporaneous>.*

*Primary Examiner* — Gregory Binda
*Assistant Examiner* — Josh Skroupa
(74) *Attorney, Agent, or Firm* — Harness, Dickey & Pierce, P.L.C.

(57) ABSTRACT

A propshaft assembly that includes a tubular member, first and second end connections coupled to opposite ends of the tubular member and a damper that is received in the tubular member and positioned between the first and second end connections. The tubular member has a wall member that defines an interior circumferential surface. The damper has a first damping device, a second damping device and a third damping device. The first damping device has a first core and a first damping member that is fixed to the first core. The first damping member extends helically about the first core and engages the interior circumferential surface. The second damping device is formed of foam and is positioned in the tubular member between the first and third damping devices. The second damping device engages the interior circumferential surface. The third damping device has a second core and a second damping member that is fixed to the second core. The second damping member extends helically about the second core and engages the interior circumferential surface.

14 Claims, 5 Drawing Sheets

(56) References Cited

U.S. PATENT DOCUMENTS

| | | | |
|---|---|---|---|
| 4,207,957 A * | 6/1980 | Sivers et al. | 180/380 |
| 4,844,193 A | 7/1989 | Veselica et al. | |
| 4,909,361 A | 3/1990 | Stark et al. | |
| 5,056,763 A | 10/1991 | Hamada et al. | |
| 5,243,880 A | 9/1993 | Beier et al. | |
| 5,287,768 A | 2/1994 | Amborn et al. | |
| 5,326,324 A | 7/1994 | Hamada | |
| 5,566,721 A | 10/1996 | Breese | |
| 5,868,627 A | 2/1999 | Stark et al. | |
| 5,904,622 A | 5/1999 | Breese et al. | |
| 5,924,531 A | 7/1999 | Stark et al. | |
| 5,976,021 A | 11/1999 | Stark et al. | |
| 5,983,497 A | 11/1999 | Breese et al. | |
| 6,023,830 A | 2/2000 | Cole et al. | |
| 6,234,911 B1 | 5/2001 | Breese et al. | |
| 6,312,340 B1 | 11/2001 | Gassen et al. | |
| 6,319,134 B1 | 11/2001 | Menosky et al. | |
| 6,370,756 B1 | 4/2002 | Conger et al. | |
| 6,409,606 B1 | 6/2002 | Nakajima et al. | |
| 6,428,017 B1 | 8/2002 | Galonska et al. | |
| 6,527,644 B2 | 3/2003 | Glowacki et al. | |
| 6,623,365 B1 | 9/2003 | Maretzke et al. | |
| 6,725,985 B2 | 4/2004 | Haneishi et al. | |
| 6,752,722 B2 | 6/2004 | Armitage et al. | |
| 6,793,050 B2 | 9/2004 | Nylander et al. | |
| 6,837,345 B1 | 1/2005 | Lauble et al. | |
| 6,874,228 B2 | 4/2005 | Armitage et al. | |
| 6,889,803 B2 | 5/2005 | Schankin et al. | |
| 6,966,413 B2 | 11/2005 | Haneishi et al. | |
| 6,989,713 B2 | 1/2006 | Matsuura et al. | |
| 7,083,523 B2 | 8/2006 | Haile et al. | |
| 7,134,964 B2 | 11/2006 | Dine et al. | |
| 7,192,357 B2 | 3/2007 | Kawakami | |
| 7,204,762 B2 | 4/2007 | Campbell | |
| 7,214,135 B2 | 5/2007 | Laskey et al. | |
| 7,320,381 B2 | 1/2008 | Patrascu et al. | |
| 7,416,491 B2 | 8/2008 | Campbell et al. | |
| 7,438,612 B2 | 10/2008 | Wada et al. | |
| 7,533,756 B2 | 5/2009 | Patrascu et al. | |
| 7,549,927 B2 | 6/2009 | Haile et al. | |
| 7,713,132 B2 | 5/2010 | Habara | |
| 7,749,086 B2 | 7/2010 | Toita | |
| 7,774,911 B2 | 8/2010 | Sun et al. | |
| 8,801,526 B1 * | 8/2014 | Conger et al. | 464/180 |
| 2004/0000456 A1 * | 1/2004 | Koleda | 188/379 |
| 2006/0276250 A1 | 12/2006 | Tkacik et al. | |
| 2006/0276251 A1 | 12/2006 | Tkacik et al. | |
| 2006/0276252 A1 | 12/2006 | Tkacik et al. | |
| 2009/0048031 A1 | 2/2009 | Conger et al. | |

* cited by examiner

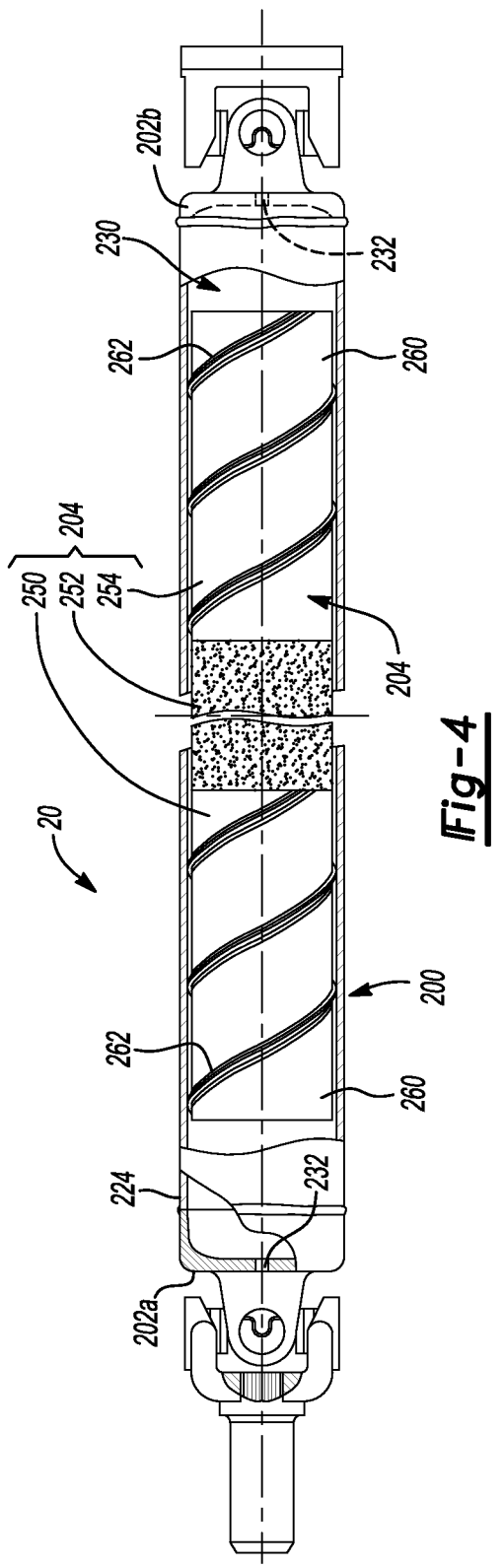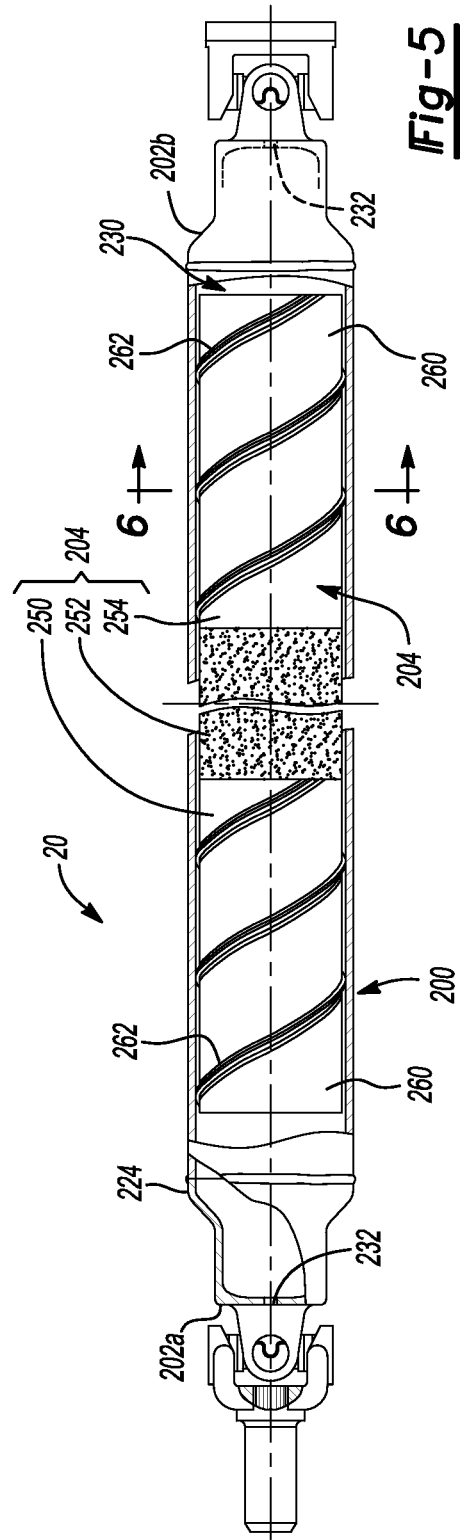

PROPSHAFT ASSEMBLY WITH DAMPER

CROSS-REFERENCE TO RELATED APPLICATIONS

This application claims the benefit of U.S. Provisional Patent Application No. 61/897,721 filed Oct. 30, 2013, the disclosure of which is incorporated by reference as if fully set forth in detail herein.

FIELD

The present disclosure relates to a propshaft assembly with a damper.

BACKGROUND

This section provides background information related to the present disclosure which is not necessarily prior art.

The consumers of modern automotive vehicles are increasingly influenced in their purchasing decisions and in their opinions of the quality of a vehicle by their satisfaction with the vehicle's sound quality. In this regard, consumers increasingly expect the interior of the vehicle to be quiet and free of noise from the power train and drive line. Consequently, vehicle manufacturers and their suppliers are under constant pressure to reduce noise to meet the increasingly stringent expectations of consumers.

Drive line components and their integration into a vehicle typically play a significant role in sound quality of a vehicle as they can provide the forcing function that excites specific driveline, suspension and body resonances to produce noise. Since this noise can be tonal in nature, it is usually readily detected by the occupants of a vehicle regardless of other noise levels. Common driveline excitation sources can include driveline imbalance and/or run-out, fluctuations in engine torque, engine idle shake, and motion variation in the meshing gear teeth of the hypoid gear set (i.e., the pinion gear and the ring gear of a differential assembly).

Propshafts are typically employed to transmit rotary power in a drive line. Modern automotive propshafts are commonly formed of relatively thin-walled steel or aluminum tubing and as such, can be receptive to various driveline excitation sources. The various excitation sources can typically cause the propshaft to vibrate in a bending (lateral) mode, a torsion mode and a shell mode. Bending mode vibration is a phenomenon wherein energy is transmitted longitudinally along the shaft and causes the shaft to bend at one or more locations. Torsion mode vibration is a phenomenon wherein energy is transmitted tangentially through the shaft and causes the shaft to twist. Shell mode vibration is a phenomenon wherein a standing wave is transmitted circumferentially about the shaft and causes the cross-section of the shaft to deflect or bend along one or more axes.

Several techniques have been employed to attenuate vibrations in propshafts including the use of weights and liners. U.S. Pat. No. 2,001,166 to Swennes, for example, discloses the use of a pair of discrete plugs or weights to attenuate vibrations. The weights of the '166 patent are frictionally engaged to the propshaft at experimentally-derived locations and as such, it appears that the weights are employed as a resistive means to attenuate bending mode vibration. As used herein, resistive attenuation of vibration refers to a vibration attenuation means that deforms as vibration energy is transmitted through it (i.e., the vibration attenuation means) so that the vibration attenuation means absorbs (and thereby attenuates) the vibration energy. While this technique can be effective, the additional mass of the weights can require changes in the propshaft mounting hardware and/or propshaft geometry (e.g., wall thickness) and/or can change the critical speed of the propshaft. Moreover, as the plugs tend to be relatively short, they typically would not effectively attenuate shell mode vibration or torsion mode vibration.

U.S. Pat. No. 2,751,765 to Rowland et al., U.S. Pat. No. 4,014,184 to Stark and U.S. Pat. Nos. 4,909,361 and 5,976,021 to Stark et al. disclose hollow liners for a propshaft. The '765 and '184 patents appear to disclose hollow multi-ply paperboard or cardboard liners that are press-fit to the propshaft; the liners are relatively long and appear to extend substantially coextensively with the hollow shaft. The '361 and '021 patents appear to disclose liners having a hollow cardboard core and a helical retaining strip that extends a relatively short distance (e.g., 0.03 inch) from the outside diameter of the core. The retaining strip has high frictional properties to frictionally engage the propshaft. Accordingly, the liners of the '765, '184, '361 and '021 patents appear to disclose a resistive means for attenuating shell mode vibration.

In view of the foregoing, there remains a need in the art for an improved propshaft assembly that is more effectively damped to control shell mode vibration.

SUMMARY

This section provides a general summary of the disclosure, and is not a comprehensive disclosure of its full scope or all of its features.

In one form, the present teachings provide a propshaft assembly that includes a tubular member, first and second end connections coupled to opposite ends of the tubular member and a damper that is received in the tubular member and positioned between the first and second end connections. The tubular member has a wall member that defines an interior circumferential surface. The damper has a first damping device, a second damping device and a third damping device. The first damping device has a first core and a first damping member that is fixed to the first core. The first damping member extends helically about the first core and engages the interior circumferential surface. The second damping device is formed of foam and is positioned in the tubular member between the first and third damping devices. The second damping device engages the interior circumferential surface. The third damping device has a second core and a second damping member that is fixed to the second core. The second damping member extends helically about the second core and engages the interior circumferential surface.

In another form, the present teachings provide a propshaft assembly that includes a tubular member, first and second end connections coupled to opposite ends of the tubular member and a damper that is received in the tubular member. The tubular member has a wall member that defines an interior circumferential surface. The damper is positioned between the first and second end connections and engages the interior circumferential surface. The damper is formed out of a foam material and defines a plurality of longitudinally extending grooves. The longitudinally extending grooves are spaced evenly apart around the circumference of the damper.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a top, partially cut away view of the propshaft assembly;

FIG. 5 is a view similar to that of FIG. 4 but illustrating a propshaft assembly that employs a tubular member having two necked-down areas;

Corresponding reference numerals indicate corresponding parts throughout the several views of the drawings.

DETAILED DESCRIPTION

Figure 1:
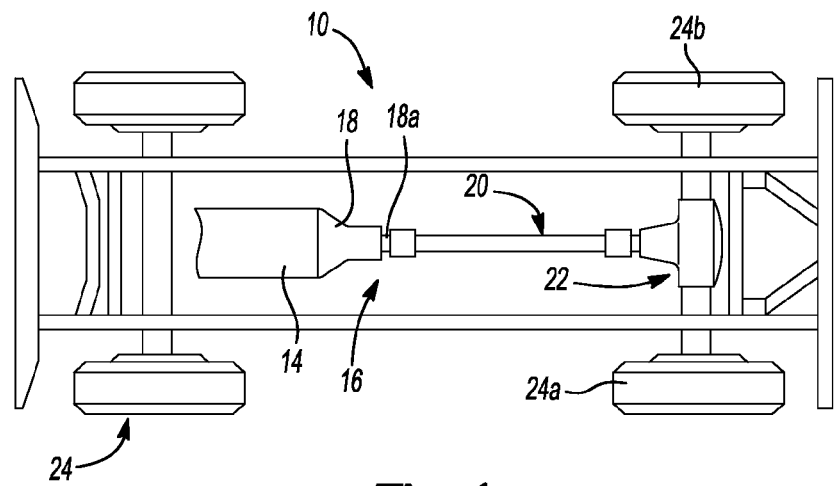
FIG. 1 is a schematic illustration of an exemplary vehicle constructed in accordance with the teachings of the present disclosure.

With reference to FIG. 1 of the drawings, an exemplary vehicle constructed in accordance with the teachings of the present disclosure is generally indicated by reference numeral 10. The vehicle 10 can include an engine 14 and a drive line 16. The drive line 16 can include a transmission 18, a propshaft assembly 20, a rear axle 22 and a plurality of wheels 24. The engine 14 can produce rotary power that can be transmitted to the transmission 18 in a conventional and well known manner. The transmission 18 can be conventionally configured and can include a transmission output shaft 18a and a gear reduction unit (not specifically shown). As is well known in the art, the gear reduction unit can change the speed and torque of the rotary power provided by the engine such that a rotary output of the transmission 18 (which can be transmitted through the transmission output shaft 18a) can have a relatively lower speed and higher torque than that which was input to the transmission 18. The propshaft assembly 20 can be coupled for rotation with the transmission output member 18a to permit drive torque to be transmitted from the transmission 18 to the rear axle 22 where can be selectively apportioned in a predetermined manner to the left and right rear wheels 24a and 24b, respectively.

It will be appreciated that while the vehicle in the particular example provided employs a drive line with a rear-wheel drive arrangement, the teachings of the present disclosure have broader applicability. In this regard, a shaft assembly constructed in accordance with the teachings of the present disclosure may interconnect a first drive line component with a second drive line component to transmit torque therebetween. In the context of an automotive vehicle, the drive line components could be a transmission, a transfer case, a viscous coupling, an axle assembly, or a differential, for example.

Figure 2:
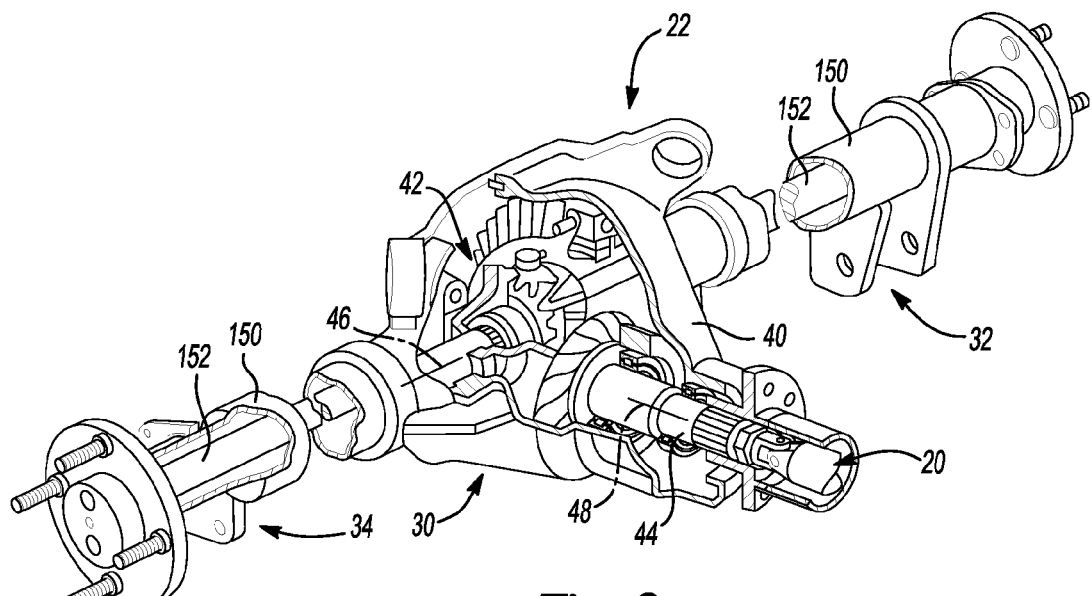
FIG. 2 is a top partially cut-away view of a portion of the vehicle of FIG. 1 illustrating the rear axle and the propshaft assembly in greater detail.

With reference to FIG. 2, the rear axle 22 can include a differential assembly 30, a left axle shaft assembly 32 and a right axle shaft assembly 34. The differential assembly 30 can include a housing 40, a differential unit 42 and an input shaft assembly 44. The housing 40 can support the differential unit 42 for rotation about a first axis 46 and can further support the input shaft assembly 44 for rotation about a second axis 48 that is perpendicular to the first axis 46.

Figure 3:
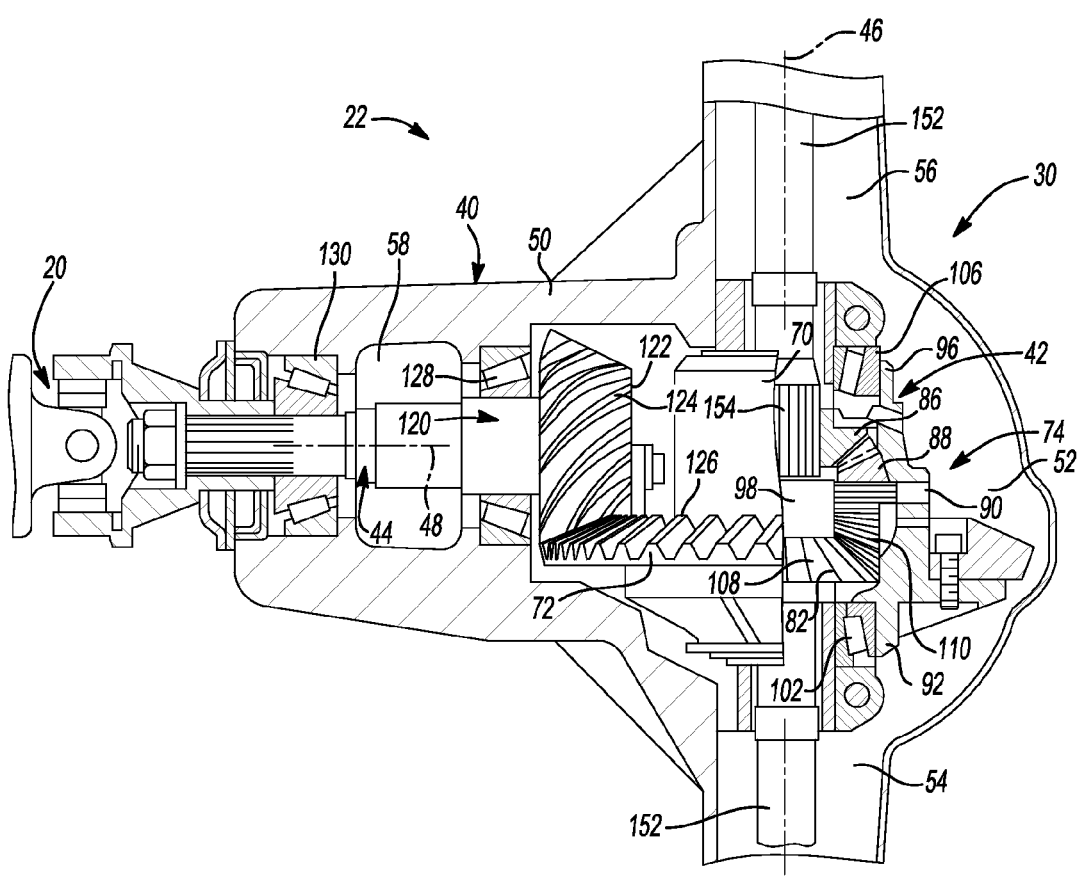
FIG. 3 is a sectional view of a portion of the rear axle and the propshaft assembly.

With additional reference to FIG. 3, the housing 40 can be formed in a suitable casting process and thereafter machined as required. The housing 40 can includes a wall member 50 that can define a central cavity 52 that can have a left axle aperture 54, a right axle aperture 56, and an input shaft aperture 58. The differential unit 42 can be disposed within the central cavity 52 of the housing 40 and can include a case 70, a ring gear 72, which can be fixed for rotation with the case 70, and a gearset 74 that can be disposed within the case 70. The gearset 74 can include first and second side gears 82 and 86 and a plurality of differential pinions 88, which can be rotatably supported on pinion shafts 90 that can be mounted to the case 70. The case 70 can include a pair of trunnions 92 and 96 and a gear cavity 98. A pair of bearing assemblies 102 and 106 can support the trunnions 92 and 96, respectively, for rotation about the first axis 46. The left and right axle assemblies 32 and 34 can extend through the left and right axle apertures 54 and 56, respectively, where they can be coupled for rotation about the first axis 46 with the first and second side gears 82 and 86, respectively. The case 70 can be operable for supporting the plurality of differential pinions 88 for rotation within the gear cavity 98 about one or more axes that can be perpendicular to the first axis 46. The first and second side gears 82 and 86 each include a plurality of teeth 108 which meshingly engage teeth 110 that are formed on the differential pinions 88.

The input shaft assembly 44 can extend through the input shaft aperture 58 where it can be supported in the housing 40 for rotation about the second axis 48. The input shaft assembly 44 can include an input shaft 120, a pinion gear 122 having a plurality of pinion teeth 124 that meshingly engage the teeth 126 that are formed on the ring gear 72, and a pair of bearing assemblies 128 and 130 that can cooperate with the housing 40 to rotatably support the input shaft 120. The input shaft assembly 44 can be coupled for rotation with the propshaft assembly 20 and can be operable for transmitting drive torque to the differential unit 42. More specifically, drive torque received the input shaft 120 can be transmitted by the pinion teeth 124 to the teeth 126 of the ring gear 72 such that drive torque is distributed through the differential pinions 88 to the first and second side gears 82 and 86.

The left and right axle shaft assemblies 32 and 34 can include an axle tube 150 that can be fixed to the associated axle aperture 54 and 56, respectively, and an axle half-shaft 152 that can be supported for rotation in the axle tube 150 about the first axis 46. Each of the axle half-shafts 152 can include an externally splined portion 154 that can meshingly engage a mating internally splined portion (not specifically shown) that can be formed into the first and second side gears 82 and 86, respectively.

With reference to FIG. 4, the propshaft assembly 20 can include a tubular member 200, a first end connection 202a, a second end connection 202b, and a damper 204. The tubular member and the first and second end connections 202a and 202b can be conventional in their construction and need not be described in significant detail herein. Briefly, the tubular member 200 can be formed of an appropriate structural material, such as steel or aluminum, and can include an annular wall member 224. The annular wall member 224 can have an interior circumferential surface 228 and can define a hollow cavity 230. Depending on the particular requirements of the vehicle 10 (FIG. 1), the wall member 224 may be sized in a uniform manner over its entire length, as is shown in FIG. 4, or may be necked down or stepped in diameter in one or more areas along its length, as is shown in FIG. 5. The first and second end connections 202a and 202b can be configured to couple the propshaft assembly 20 to other rotary components of the vehicle 10 (FIG. 1) in a desired manner to transmit rotary power therebetween. For example, the first end connection 202a and/or the second end connection 202b could comprise a universal joint (e.g., Cardan or constant velocity joint) or components thereof. Optionally, one or both of the first and second end connections 202a and 202b can be vented to permit air to flow into or out of the hollow cavity 230. In the particular example provided, a vent 232 is installed to each of the first and second end connections 202a and 202b. In the particular example provided, the vents 232 comprise holes formed in the first and second end connections 202a and 202b, but it will be appreciated that the vent(s) 232 can be constructed in any desired manner.

The damper 204 can comprise a first damping device 250, a second damping device 252 and a third damping device 254. The damper 204 can be effective in attenuating shell mode vibration transmitted through the tubular member 200, but may also be effective in attenuating other vibration modes, such as torsion mode vibration and/or bending mode vibration through the tubular member 200. Shell mode vibration, also known as breathing mode vibration, is a phenomenon wherein a standing wave is transmitted circumferentially about the tubular member 200 and causes the cross-section of the shaft to deflect (e.g., expand or contract) and/or bend along one or more axes. Torsion mode vibration is a phenomenon wherein energy is transmitted tangentially through the shaft and causes the shaft to twist. Bending mode vibration is a phenomenon wherein energy is transmitted longitudinally along the shaft and causes the shaft to bend at one or more locations.

The first damping device 250 can be constructed and positioned along the tubular member 200 in a manner that is similar to that which is described in commonly assigned U.S. Pat. No. 7,774,911 entitled "Method For Attenuating Driveline Vibrations", the disclosure of which is incorporated by reference as if fully set forth in detail herein. Briefly, the first damping device 250 can comprise a base or core 260 and a damping member 262. The core 260 can be formed of an appropriate structural material, such as a lightweight fibrous material. For example, the core 260 can be formed of two or more plies of paperboard or cardboard, wherein the plies can overlie one another in a desired manner. In the example provided, the core 260 is formed of paperboard and the plies are helically wrapped.

Figure 6:
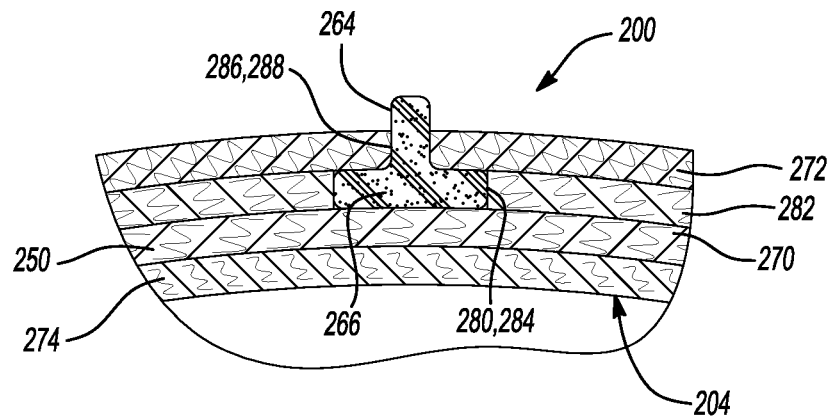
FIG. 6 is a lateral section view of a portion of the of the propshaft assembly of FIG. 4, taken through a first damping device of a damper.

The damping member 262 can comprise a length of an elastic, rubbery material, such as ethylene propylene diene monomer (EPDM) rubber or silicone rubber, having friction properties much greater than those of the inside circumferential surface of the tubular member 200. The damping member 262 can be fixedly coupled to the core 260 and can extend radially outwardly therefrom where it can terminate at one or more contact elements 264, such protuberances, fingers, projections, that are configured to contact the inside circumferential surface 228 of the tubular member 200. In the particular example provided, the damping member 262 is generally T-shaped, having a base 266, which is fixedly coupled to the core 260, and a contact element 264 that is shaped as a finger that extends perpendicularly from the base 266. The damping member 262 can be secured to the core 260 in any desired manner. For example, the damping member 262 can be bonded to the core 260 with a suitable adhesive material such that the first damping member 262 extends helically about the core 260. With additional reference to FIG. 6, the base 266 in the example provided is bonded to an intermediate ply 270 of paperboard (i.e., a ply that is disposed radially inwardly of the outermost ply 272 and radially outwardly of the innermost ply 274) and the plys of paperboard that are disposed radially outwardly of the intermediate ply 270 are wrapped such that the sides of the material that forms the ply are abutted against the damping member 262. In the example shown, the edges 280 of a first one of the plys 282 that is disposed radially outwardly of the intermediate ply 270 are abutted against the sides 284 of the base 266, while the edges 286 of the outermost ply 272 are abutted against the sides 288 of the contact element 264 such that the outermost ply 272 overlies the base 266 on its radially outward side. The damping member 262 can extend over a desired portion of the length of the core 260, such as substantially all of the length of the core 260. The helical pitch of the damping member 262 can be selected to provide a desired level of damping.

The third damping device 254 can be generally similar in its construction to the first damping device 250 and as such, need not be described herein in significant detail. In the particular example provided, the first and third damping devices 250 and 254 are identical, but it will be appreciated that the third damping device 254 can be configured somewhat differently from the first damping device 250 to tune the damper 204 to a particular vehicle 10 (FIG. 1). It will be appreciated, for example, that various characteristics of the third damping device 254 could be varied from those of the first damping device 250 in order to achieve desired performance of the damper 204, including the pitch of the damping member 262, the direction of the helix of the damping member 262, the configuration or number of contact elements 264, the length of the core 260 and the extent to which the damping member 262 extends over the length of the core 260.

Figure 7:
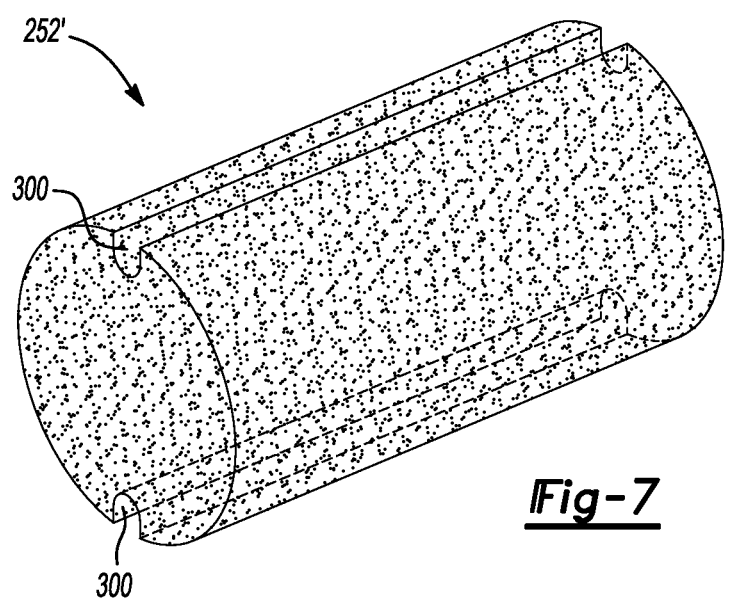
FIG. 7 is a perspective view of an alternately constructed second damping device.
Figure 8:
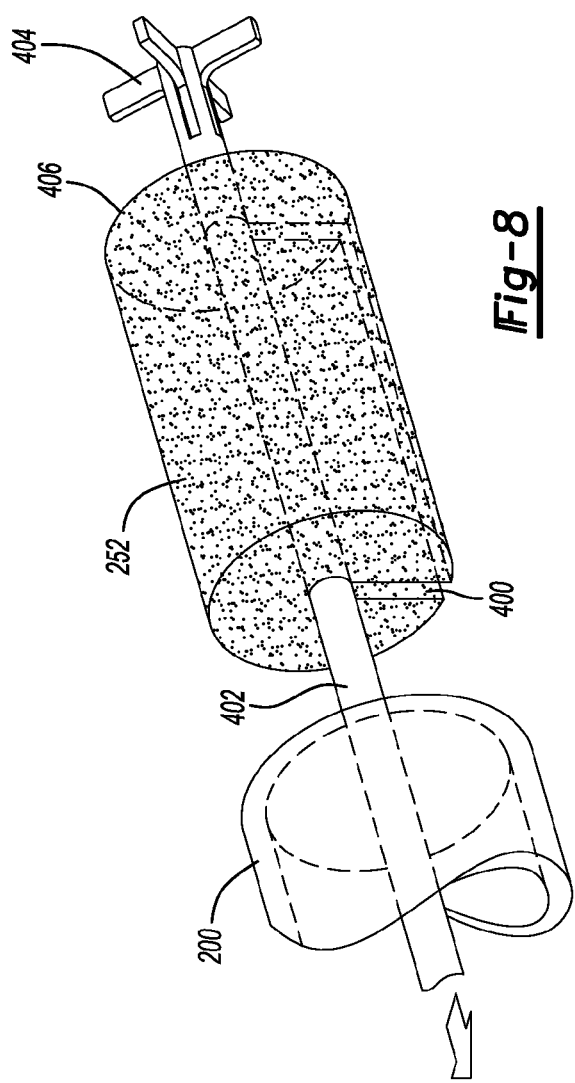
FIG. 8 is a perspective view of a second damping device installed over a ram of an assembly tool that is employed to insert the second damping device into a tubular member.

The second damping device 252 can be formed of a suitable damping material, such as a length of foam. In the particular example provided, the second damping device 252 is a length of a cylindrically-shaped closed-cell foam that can be formed of a suitable material. Examples of suitable materials include polyethylene; polyurethane; sponge rubber; PVC and vinyl nitrile blends; PP and nylon foam blends; and melamine, polyimide and silicone. It will be appreciated that various other materials, such as an open-cell foam, or that one or more apertures could be formed longitudinally through the second damping device 252. For example, an alternately constructed second damping device 252' could be formed with a plurality of longitudinally extending grooves 300 as shown in FIG. 7. The grooves 300 can be configured to permit fluid communication through the second damping device 252' when the second damping device 252' is installed to a tubular member 200 (FIG. 4). The grooves 300 can be positioned about the circumference of the second damping device 252' in a desired manner to affect the balance of the propshaft assembly 20 (FIG. 1). For example, the grooves 300 can be evenly spaced about the circumference of the second damping device 252' to minimize the effect of the second damping device 252' on the balance of the propshaft assembly 20 (FIG. 1). It will be appreciated that one or more of the second damping devices 252' could be employed to damp a propshaft assembly, with or without the first and/or third dampening devices 250 and 254.

The second damping device 252 can have an appropriate density, such as between 1.0 pounds per cubic foot to 2.5 pounds per cubic foot, preferably between 1.2 pounds per cubic foot to about 1.8 pounds per cubic foot, and more preferably between 1.20 pounds per cubic foot to 1.60 pounds per cubic foot. In the particular example provided, the second damping device 252 has a density of 1.45 pounds per cubic foot. The second damping device 252 can be sized in a manner so that it is compressed against the inside circumferential surface 228 of the tubular member 200 to a desired degree. For example, the second damping device 252 can have an outer circumferential diameter that is about 5% to about 20% larger than the diameter of the inside circumferential surface 228 of the tubular member 200, and more preferably about 10% larger than the diameter of the inside circumferential surface 228 of the tubular member 200.

The damper 204 can be tuned for a particular vehicle configuration in part by altering one or more characteristics of the components of the damper 204, such as the positions of the first, second and third damping devices 250, 252 and 254 relative to the tubular member 200, the lengths of the first, second and third damping devices 250, 252 and 254. In the particular example provided, the first, second and third damping devices 250, 252 and 254 are spaced axially apart from one another along the longitudinal axis of the tubular member 200. For example, the second damping device 252 can be sized as long as possible without contacting the first and/or third damping devices 250 and 254. It will be appreciated, however, that the second damping device 252 could be sized in length to contact one or both of the first and third damping devices 250 and 254.

The damper 204 can be installed to the tubular member 200 in any desired manner. For example, the damper 204 can be pushed into the tubular member 200 with a ram (not shown) contemporaneously (i.e., sequentially, but in the same insertion cycle, for example as with a single stroke of a ram) so that the first, second and third damping devices 250, 252 and 254 abut one another. Alternatively, the first, second and third damping devices 250, 252 and 254 can be installed to the tubular member 200 individually, or the second damping device 252 can be installed to the tubular member 200 contemporaneously with one of the first and third damping devices 250 and 254. In situations where the first, second and third damping devices 250, 252 and 254 are not installed contemporaneously, one or more features can be incorporated into the second damping device 252 to receive assembly tooling. For example, a longitudinal slit 400 can be formed through the second damping device 252. The longitudinal slit 400 permits a technician to assemble the second damping device 252 onto a ram 402 having retractable fingers 404 that extend from the ram 402 to abut an axial end 406 of the second damping device 252. The ram 402 can be pushed through the tubular member 200 in a first direction, the second damping device 252 loaded onto the ram 200, the ram 200 can be pulled into the tubular member 200 (i.e., moved in a second direction opposite the first direction) to position the second damping device 252 within the tubular member 200, the fingers 204 can be retracted and the ram 200 can be pulled out of the ram 200 (i.e, further moved in the second direction).

As another alternative, the first and third damping members 250 and 254 can be installed to the tubular member 200 to form an intermediate sub-assembly, the intermediate sub-assembly can be heat-treated to age the material that forms the tubular member 200, and the second damping member 252 can be installed between the first and third damping members 250 and 254 when the intermediate sub-assembly has cooled sufficiently. It will be appreciated that in this assembly method, the second damping member 252 can be pushed through the first damping member 250 or the third damping member 254 when it is positioned in the tubular member 200 between the first and third damping members 250 and 254.

Figure 9:
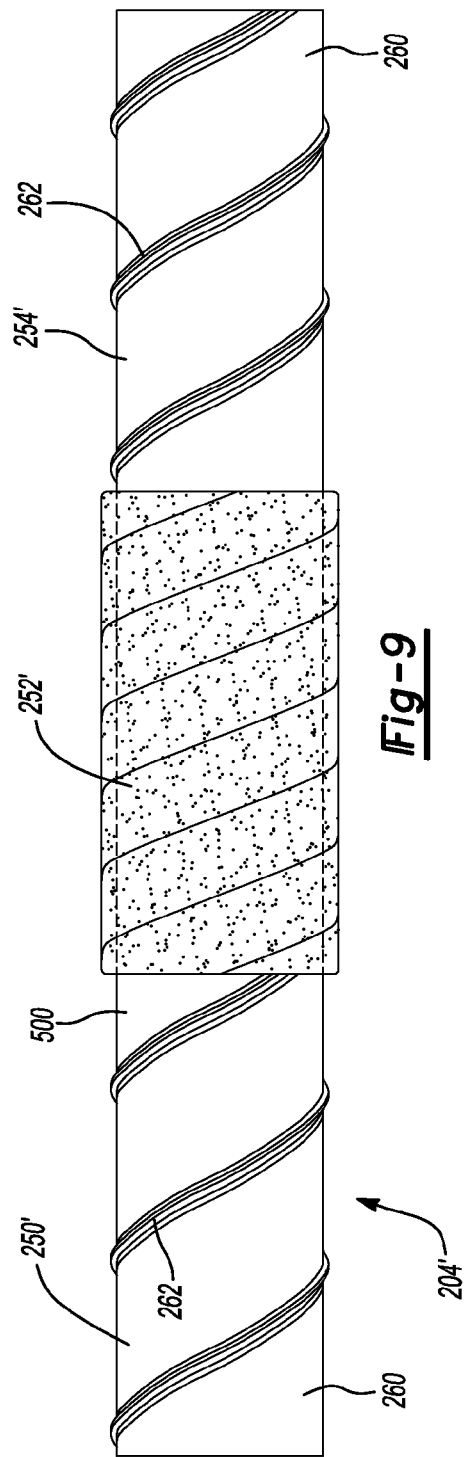
FIG. 9 is a perspective view of another damper constructed in accordance with the teachings of the present disclosure.

While the damper 204 has been illustrated and described as comprising first, second and third damping devices 250, 252 and 254 that are formed as discrete components that are capable of being separately installed to the tubular member, it will be appreciated that the damper could be constructed somewhat differently. With reference to FIG. 9, a damper 204' constructed in accordance with the teachings of the present disclosure could be formed such that the first, second and third damping devices 250', 252' and 254' are fixed together so as to be capable of being inserted to the tubular member 200 (FIG. 4) as a unit. For example, the cores 260 of the first and third damping devices 250' and 254' could be portions of a unitarily formed core member 500 and the second damping device 252' could be fixedly mounted to the core member 500 between the damping members 262 of the first and third damping devices 250' and 254'. For ease of manufacture, the second damping device 252' could be formed of a strip of foam that could be wrapped onto the core member 500.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A propshaft assembly comprising:
a tubular member having a wall member that defines an interior circumferential surface;
first and second end connections coupled to opposite ends of the tubular member; and
a damper received in the tubular member and positioned between the first and second end connections, the damper comprising a first damping device, a second damping device and a third damping device, the first damping device comprising a first core and a first damping member that is fixed to the first core, the first damping member extending helically about the first core and engaging the interior circumferential surface, the second damping device being formed of foam and being positioned in the tubular member between the first and third damping devices, the second damping device engaging the interior circumferential surface, the third damping device comprising a second core and a second damping member that is fixed to the second core, the second damping member extending helically about the second core and engaging the interior circumferential surface.

2. The propshaft assembly of claim 1, wherein the first damping device is spaced apart from the second damping device along a longitudinal axis of the tubular member.

3. The propshaft assembly of claim 2, wherein the third damping device is spaced apart from the second damping device along the longitudinal axis of the tubular member.

4. The propshaft assembly of claim 1, wherein the first, second and third damping devices are fixed together in an axial direction so as to be capable of being inserted to the tubular member as a unit.

5. The propshaft assembly of claim 4, wherein the first and second cores are portions of a unitarily formed core member and wherein the second damping device is mounted on the core member.

6. The propshaft assembly of claim 4, wherein the second damping device comprises a strip of foam that is wound onto the core member.

7. The propshaft assembly of claim 1, wherein the foam is a closed-cell foam and wherein the closed-cell foam has a density of between 1.0 pounds per cubic foot and 2.5 pounds per cubic foot.

8. The propshaft assembly of claim 7, wherein the density is between 1.2 pounds per cubic foot and 1.8 pounds per cubic foot.

9. The propshaft assembly of claim 7, wherein the density is between 1.20 pounds per cubic foot and 1.60 pounds per cubic foot.

10. The propshaft assembly of claim 1, wherein the core is formed of a fibrous material.

11. The propshaft assembly of claim 10, wherein the fibrous material is a cardboard or a paperboard.

12. The propshaft assembly of claim 1, wherein a diameter of the second damping device taken about an outside surface of the second damping device is 5% to 20% larger than a diameter of the inside circumferential surface prior to installation of the damper into the tubular member.

13. The propshaft assembly of claim 12, wherein the diameter of the second damping device taken about the outside surface of the second damping device is about 10% larger than the diameter of the inside circumferential surface prior to installation of the damper into the tubular member.

14. A method for assembling a propshaft assembly, the method comprising:
   providing a tubular member having an annular wall member that defines an interior circumferential surface;
   providing a damper having a first damping member, a second damping member and a third damping member, each of the first, second and third damping members being a discrete structure, the second damping member being formed of foam;
   inserting the first, second and third damping members into the tubular member, each of the first, second and third damping members directly engaging the interior circumferential surface and attenuating shell mode vibration transmitted through the tubular member, wherein the second damping member is disposed between the first and third damping members
   wherein the second damping member is inserted through one of the first and third damping members.

* * * * *